United States Patent [19]

Savides et al.

[11] 4,003,861
[45] Jan. 18, 1977

[54] MELAMINE PYROPHOSPHATE AS FLAME-RETARDANT IN POLYURETHANE FOAM COMPOSITIONS

[75] Inventors: Christos Savides; Joseph Frederick Cannelongo, both of Piscataway, N.J.

[73] Assignee: American Cyanamid Company, Stamford, Conn.

[22] Filed: July 9, 1975

[21] Appl. No.: 594,470

Related U.S. Application Data

[63] Continuation-in-part of Ser. No. 393,374, Aug. 31, 1973, abandoned, which is a continuation of Ser. No. 261,187, June 9, 1972, abandoned.

[52] U.S. Cl. ............... 260/2.5 AJ; 260/2.5 AS; 260/45.8 NT; 260/77.5 SS
[51] Int. Cl.² ............... C08G 18/14; C08G 18/48; C08K 5/52; C08K 5/34
[58] Field of Search ............... 260/2.5 AJ, 2.5 AS, 260/77.5 AS, 45.8 NT

[56] References Cited

UNITED STATES PATENTS

| | | | |
|---|---|---|---|
| 2,544,706 | 3/1951 | Malowan | 260/249.6 |
| 3,134,742 | 5/1964 | Wismer | 260/2.5 AJ |
| 3,635,970 | 1/1972 | Fessler | 260/249.6 |
| 3,666,401 | 5/1972 | Cahill | 106/15 FP |
| 3,681,273 | 8/1972 | Kelly | 260/2.5 AJ |
| 3,839,239 | 10/1974 | Godfried | 260/45.8 NT |
| 3,914,193 | 10/1975 | Fessler | 260/45.8 NT |
| 3,914,513 | 10/1975 | Brown | 260/28.5 A |

*Primary Examiner*—C. Warren Ivy
*Attorney, Agent, or Firm*—Frank M. Van Riet

[57] ABSTRACT

A method of flame-retarding polyurethane foams wherein melamine pyrophosphate is added thereto and the resultant flame-retarded foams per se, are disclosed.

10 Claims, No Drawings

MELAMINE PYROPHOSPHATE AS FLAME-RETARDANT IN POLYURETHANE FOAM COMPOSITIONS

CROSS-REFERENCE TO RELATED APPLICATIONS

This application is a continuation-in-part of our application, Ser. No. 393,374, filed Aug. 31, 1973, and entitled MELAMINE PYROPHOSPHATE AS FLAME-RETARDANT IN POLYURETHANE COMPOSITIONS which, in turn, is a continuation of our application, Ser. No. 261,187, filed June 9, 1972; both are now abandoned.

BACKGROUND OF THE INVENTION

The production of polyurethane foams has become increasingly more important in recent years, especially in view of the tremendous increase in the applications which have been found for these materials. For example, foamed polyurethanes have gained significant status in the fields of insulation, electrical equipment, structural elements of furniture, automobile seats and the like.

As the applications for polyurethane foams increase, so do the requirements which must be adhered to with regard to the properties of such foams. One basic requirement which has become more important is the need for the foams to be flame and fire resistant. As a result, various types of materials, both organic and inorganic, have been utilized to impart flame-retardant properties thereto. Many of the additives which have been tested are those which have been previously found effective in fibers, textiles and other plastics. When such materials are applied to polyurethane foams, however, they are generally not effective in practical concentrations or must be used in conjunction with other additives in order to function effectively.

Examples of types of additives which have been suggested for imparting flame-retardance to polyurethane foams include antimony oxide; nitrogen-phosphorus materials such as ammonium orthophosphate, ammonium polyphosphate etc.; mixtures of antimony trioxide and a vinyl halide resin; and mixtures of nitrogen-containing materials with phosphorus-containing compounds, more specific examples of which are used in conjunction with phosphorus-containing or nitrogen-containing polyols, see U.S. Pat. No. 3,134,742 and 3,681,273. Although these patents teach that the enumerated combinations are effective, the phosphorus-nitrogen compounds alone are said to be ineffective.

SUMMARY

We have now discovered that flame-retardant properties may be imparted to polyurethane foams by the incorporation therein, preferably during the formation thereof, of melamine pyrophosphate. The melamine pyrophosphate is useful in concentrations which are practical and economic and, in addition do not adversely affect the other physical properties of the foam.

Although the use of such a compound may be generically suggested in the above-identified patents, which are hereby incorporated herein by reference, the method disclosed in U.S. Pat. No. 3,134,742 for the production of the phosphorus-nitrogen compounds taught therein employs such a high temperature that the simple melamine pyrophosphate salt is not produced. Instead, a melamine-phosphorus complex results (see U.S. Pat. No. 2,544,706). Secondly, U.S. Pat. Nos. 3,134,742 and 3,681,273 require that the phosphorus-nitrogen complex be used in conjunction with a liquid phosphorus-containing or nitrogen-containing polyol in order that effective flame-proofing of the resultant foam be achieved.

DESCRIPTION OF THE INVENTION INCLUDING PREFERRED EMBODIMENTS

As mentioned briefly above, we have now discovered that melamine pyrophosphate salt can be incorporated into polyurethane foams and thereby impart a high degree of flame-retardance thereto.

Melamine pyrophosphate is a commercially available material and can be prepared by any conventional method such as that disclosed in U.S.S.R. Pat. No. 67,616 (CA; Vol. 43; pg. 3473) or as shown in a publication by Vol'frovich et al., Izv. Akad, Nauk SSR, Otd. Khim Nauk No. 6 (1946) pages 571-579.

A new crystalline form of melamine pyrophosphate which has been found to be particularly useful for imparting flame-retardance to polyurethane foam according to the present invention is disclosed and claimed in U.S. Pat. No. 3,635,970.

In the preparation of the flame-retarded compositions of the present invention, the melamine pyrophosphate is normally added to the components used to form the polyurethane; however, the pyrophosphate can be added equally as effectively to any one or more ingredients of the foam, the particular method of incorporation forming no part of the instant invention. Generally, we have found that from about 12 to about 20 parts, by weight, of the melamine pyrophosphate per 100 parts of the polyol used in the preparation of the polyurethane should be employed.

Typical of the method of production of our novel compositions is the preparation of a mixture of the isocyanate, melemine pyrophosphate, a catalyst, a blowing agent and a surfactant. This mixture is then combined with the polyol under known conditions and the polyurethane forms in a foamed state.

The compositions of our invention are formed by the conventional methods of polyurethane foam production wherein an isocyanate and a phosphorus-free and nitrogen-free polyol are reacted in the presence of a catalyst. Any other materials normally employed in the preparation of such foams may also be used. For example, blowing agents such as halogenated hydrocarbons, surfactants including silicones etc., more specific examples of which are set forth in the above-incorporated U.S. patent.

Typical of useful isocyanates are toluene diisocyanate, methylene bis(phenylisocyanate), polymethylene polyphenylisocyanate and the like. Phosphorus-free and nitrogen-free polyols, also taught in U.S. Pat. Nos. 3,134,742 and 3,681,273 include those based on the reaction products of glycerol, sorbitol, methyl glucoside, sucrose etc. with conventional coreactants such as ethylene oxide, propylene oxide etc.

Any other additives such as dyes, pigments, fillers, stabilizers, absorbers, etc. may also be added to our novel compositions without departing from the scope of the instant invention.

The following examples are set forth for purposes of illustration only and are not to be construed as limitations on the instant invention except as set forth in the appended claims. All parts and percentages are by weight unless otherwise specified.

EXAMPLE 1

To a high speed mixer are added 107 parts of polymethylene polyphenylisocyanate, 15 parts of melamine pyrophosphate (conventional crystal form), 1.0 part of a commercially available silicone surfactant, 1.0 part of triethylene diamine catalyst and 40.0 parts of a commercially available foaming agent (trichlorofluoromethane). The ingredients are thoroughly admixed for about 15 seconds. The resultant mixture is then added to 100 parts of a commercially available, nitrogen-free and phosphorus-free, sorbitol based polyol and blended for 15 seconds. The complete composition is then poured into a formed container. Foaming occurs immediately. Upon subjecting the recovered foam to ASTM D 1692 Standard Test Method, the foam is classified as self-extinguishing. When a foam is produced of identical ingredients except that the melamine pyrophosphate is eliminated, the resultant foam is classified as free-burning.

EXAMPLE 2

The procedure of Example 1 is again followed except that 107 parts of polymethylene polyphenylisocyanate, 100 parts of a commercially available, nitrogen-free and phosphorus-free, sorbitol based polyol, 20 parts of melamine pyrophosphate having a maximum intensity peak in its X-ray diffraction pattern at about 3.25A and other peaks at about 4.71A, 4.94A, 5.33A, 10.64A and 10.77A (see U.S. Pat. No. 3,635,970), 30 parts of the same halogenated blowing agent, 1.0 part of tetramethyl quanidine catalyst and 2.0 parts of a commercially available silicone surfactant are employed.

The resultant formed product is recovered and subjected to the ASTM D 1692 flame test. The results are as follows:

| A. | After 24 hours conditioning at room temperature | self-extinguishing |
|---|---|---|
| B. | After 72 hours humid aging at 158°F./100% RH | self-extinguishing |
| C. | Control: No melamine pyrophosphate | free-burning |

EXAMPLE 3

When the procedure of Example 2 is again followed except that only 15.0 parts of melamine pyrophosphate are employed, the foam produced is again rated as self-extinguishing.

Following the procedure of Example 1, various other ingredients are employed with melamine pyrophosphate in the preparation of flame-retarded polyurethane foams. The results of these tests are set forth in Table I, below. In each Example, the blowing agent was $CF_3Cl$ and the surfactant was silicone.

TABLE 1

| Ex. | Isocyanate | Polyol | MPP of Ex. No. | Catalyst | Flame-Test Results |
|---|---|---|---|---|---|
| 4 | Toluene Diisocyanate (80/20 mixed isomers) | Sucrose-propylene oxide (1/12) reaction product | 1 | Tetramethyl-1,3-butanediamine | SE |
| 5 | Methylenebis(phenylisocyanate) | Sucrose-propylene oxide-ethylene oxide (1/11/4) reaction product | 2 | Dimethylethanol amine | SE |
| 6 | Toluene diisocyanate (80/20) | Polyester (adipic acid-phthalic anhydride-ethylene glycol-glycerol) reaction product | 2 | Same as Ex. 1 | SE |
| 7 | Methylenebis(phenylisocyanate) | Sorbitol-propylene oxide reaction product | 2 | " | SE |
| 8 | Toluene diisocyanate (80/20) | Methyl glucoside-propylene oxide reaction product | 1 | " | SE |
| 9 | Toluene diisocyanate (80/20) | Same as Ex. 7 | 1 | " | SE |
| 10 | Methylenebis(phenylisocyanate) | Same as Ex. 8 | 1 | " | SE |
| 11 | Toluene diisocyanate (80/20) | Glycerol-propylene oxide reaction product | 2 | " | SE |
| 12 | Polymethylene polyphenylisocyanate | Same as Ex. 11 | 1 | " | SE |

Code:
MPP=melamine pyrophosphate
SE=self-extinguishing

We claim:

1. A flame-retarded composition comprising a foamed polyurethane resin derived solely from the coreaction of a phosphorus-free and nitrogen-free polyol and an aromatic diisocyanate and containing from about 12 to about 20 parts, by weight, of melamine pyrophosphate salt per 100 parts of polyol.

2. A composition according to claim 1 wherein said aromatic diisocyanate is polymethylene polyphenylisocyanate.

3. A composition according to claim 1 wherein said aromatic diisocyanate is toluene diisocyanate.

4. A composition according to claim 1 wherein said polyol is sorbitol based.

5. A composition according to claim 1 wherein said melamine pyrophosphate has a maximum intensity peak in its X-ray diffraction pattern at about 3.25A and other peaks at about 4.71A, 4.94A, 5.33A, 10.64A and 10.77A.

6. A method of producing the composition of claim 1 which comprises incorporating in a foam derived solely from a phosphorus-free and nitrogen-free polyol and an aromatic diisocyanate during the formation thereof, from about 12 to about 20 parts of melamine pyrophosphate per 100 parts of polyol.

7. A method according to claim 6 wherein said polyol is sorbitol based.

8. A method according to claim 6 wherein said melamine pyrophosphate has a maximum intensity peak in its X-ray diffraction pattern at about 3.25A and other peaks at about 4.71A, 4.94A, 5.33A, and 10.64A and 10.77A.

9. A method according to claim 6 wherein said aromatic diisocyanate is toluene diisocyanate.

10. A method according to claim 6 wherein said aromatic diisocyanate is polymethylene polyphenylisocyanate.

* * * * *